Reissued May 9, 1933

Re. 18,824

UNITED STATES PATENT OFFICE

RICHARD R. WALTER, OF STARNBERG, GERMANY

AZOTIZED TUNGSTEN CARBIDE AND PROCESS OF MAKING IT

No Drawing. Original No. 1,803,276, dated April 28, 1931, Serial No. 259,605, filed March 6, 1928, and in Germany May 13, 1927. Application for reissue filed December 2, 1932. Serial No. 645,477.

The combinations of nitrogen with metals, so far as they disclose metallic character, reveal themselves throughout as of great hardness. Heretofore, in the case of articles subject to hard wear, this characteristic has been utilized by superficial nitrification and thereby supplied them with a hard outer layer.

Such earlier nitrification is successful in useful form only under very definite circumstances and exactly specified conditions and moreover was previously not possible with a considerable number of metals. For instance, the nitrification of metals of the chromium group has not as yet been accomplished and the deficient reaction or reactionability between nitrogen and, for example, tungsten has been utilized in such a way that, during the later working with tungsten in highly heated condition, it was enveloped with a nitrogen atmosphere as a protection against oxidation.

I have made the discovery that the nitrification is consummated with markedly greater facility and is also possible with such metals which heretofore resisted it, especially with all metals of the iron and chromium groups, when the nitrification proceeding follows a superficial carburization or when a carburization occurs simultaneously with the nitrification.

For example, if tungsten, which heretofore has not been capable of nitrification in the ordinary way, is shortly beforehand superficially carbonized, either while glowing in pulverized carbon or through transition of hydrocarbons and then exposed to the action of the nitrogen, the nitrification eventuates in a satisfactory manner in a short time. The utilization of dissociated nitrogen thereby proves itself as particularly advantageous, for example, by aggregation with known nitrogen compounds like the cyanamids and carbamids among others; or by transition of gaseous or vaporous nitrogen compounds.

According to my declared invention the carburization process can also occur simultaneously with the nitrification; in addition to the use of tenacious combinations the gas or vapor-like reaction medium here shows itself to advantage. Thus, for example, ammonia gas and marsh gas or coal gas will be conducted simultaneously over the heated metals and substitution may also be made for them by vaporous, fluid hydrocarbons like benzol vapor.

With the aid of the foregoing method it is also possible to nitrificate without difficulty metal carbides which heretofore likewise resisted reaction with nitrogen, as for example the carbides of chromium or tungsten or molybdenum and others, advantageously also in a powdered condition.

According to this process, heretofore unknown nitrogen compounds with carbon and heavy metals occur, which I term carbonitrides, or azotized carbides.

The process is according to my invention successful only if, as described, dissociated or nascent nitrogen is utilized.

I claim:—

1. The process for producing tungsten carbonitrides, comprising, causing carburization and nitrification reactions with tungsten to occur in the presence of carbon, dissociated nitrogen and heat.

2. The process for producing a tungsten carbonitride which comprises, exposing a powdered mass of tungsten and a hydrocarbon to dissociated nitrogen in the presence of heat.

3. The process for producing homogeneously permeated tungsten carbonitride articles which comprises, bringing tungsten carbide to a glowing heat while exposing to the action of dissociated nitrogen.

4. The process for achieving a tungsten carbonitride, which comprises, exposing a powdered mixture of carbon and tungsten to dissociated nitrogen in the presence of heat.

5. The process for producing metalliform tungsten carbonitride, comprising, bringing a powdered tungsten aggregate to a glowing heat in the presence of a carbonaceous vehicle and subjecting the carburized tungsten powder to dissociated nitrogen while maintaining the heat, whereupon a carbonitrification reaction occurs homogeneously throughout the aggregate.

6. The process for producing tungsten carbonitrides, comprising, causing dissociated nitrogen homogeneously to react throughout a powdered mass af tungsten carbide while applying heat sufficient to cause the latter to glow.

7. As a new composition of matter, an azotized tungsten carbide.

Signed at Munich, Germany, the 2nd day of November, 1932.

RICHARD R. WALTER.